(12) United States Patent
Johansson

(10) Patent No.: US 12,191,652 B2
(45) Date of Patent: Jan. 7, 2025

(54) CIRCUIT BREAKER FOR BREAKING AN ELECTRICAL CIRCUIT

(71) Applicant: Blixt Tech AB, Kista (SE)

(72) Inventor: Jan Johansson, Solna (SE)

(73) Assignee: Blixt Tech AB, Kista (SE)

( * ) Notice: Subject to any disclaimer, the term of this patent is extended or adjusted under 35 U.S.C. 154(b) by 313 days.

(21) Appl. No.: 17/600,771

(22) PCT Filed: Apr. 3, 2020

(86) PCT No.: PCT/SE2020/050352
§ 371 (c)(1),
(2) Date: Oct. 1, 2021

(87) PCT Pub. No.: WO2020/204806
PCT Pub. Date: Oct. 8, 2020

(65) Prior Publication Data
US 2022/0200262 A1 Jun. 23, 2022

(30) Foreign Application Priority Data

Apr. 5, 2019 (SE) .................................... 1950424-0

(51) Int. Cl.
*H02H 3/093* (2006.01)
*H02H 1/00* (2006.01)
(Continued)

(52) U.S. Cl.
CPC ............ *H02H 3/08* (2013.01); *H02H 1/0007* (2013.01); *H02H 3/093* (2013.01); *H01H 83/20* (2013.01); *H02H 3/06* (2013.01)

(58) Field of Classification Search
CPC .. H02H 3/02; H02H 3/06; H02H 3/08; H02H 3/081; H02H 3/087; H02H 3/093;
(Continued)

(56) References Cited

U.S. PATENT DOCUMENTS 4,319,182 A 3/1982 Hartranft et al.
4,528,494 A 7/1985 Bloomer
(Continued)

*Primary Examiner* — Thienvu V Tran
*Assistant Examiner* — Shahzeb K Ahmad
(74) *Attorney, Agent, or Firm* — Blank Rome LLP

(57) ABSTRACT

The invention relates to a circuit breaker for an electrical circuit. The circuit breaker (100) is arranged between a power supply (302) and a load (304), wherein the circuit breaker (100) comprises control means (104) configured to switch switching means (106) of the circuit breaker (100) between an ON-mode in which a current i is fed to the load (304), and an OFF-mode in which no current is fed to the load (304); wherein the control means (104) is configured to obtain a value of the current i fed to the load (304) when the switching means (106) is in the ON-mode; keep the switching means (106) in the ON-mode if the value of the current i is smaller than a switching current is of the circuit breaker (100); switch the switching means (106) into the OFF-mode if the value of the current i is larger than the switching current is of the circuit breaker (100); and switch the switching means (106) from the OFF-mode back into the ON-mode after a first time interval Furthermore, the invention also relates to a circuit and a method.

16 Claims, 4 Drawing Sheets

(51) Int. Cl.
*H02H 3/08* (2006.01)
*H01H 83/20* (2006.01)
*H02H 3/06* (2006.01)

(58) Field of Classification Search
CPC .......... H02H 3/44; H02H 1/0007; H02H 7/10; H02H 7/22; H01H 83/20; H02M 1/32; H03K 17/08; H03K 17/18; H03K 17/0828; H03K 2217/0027
See application file for complete search history.

(56) References Cited

U.S. PATENT DOCUMENTS

| | | |
|---|---|---|
| 4,567,425 A | 1/1986 | Bloomer |
| 4,626,698 A | 12/1986 | Harnden, Jr. et al. |
| 4,672,301 A | 6/1987 | Westfall et al. |
| 2005/0040835 A1* | 2/2005 | Loucks ................ G01R 27/205 |
| | | 324/713 |
| 2015/0229121 A1* | 8/2015 | Davidson ............... H02H 9/043 |
| | | 361/54 |
| 2015/0371798 A1* | 12/2015 | Zheng .................... H02H 5/044 |
| | | 361/86 |
| 2016/0301200 A1* | 10/2016 | Niehoff .................. H02H 3/021 |
| 2019/0103742 A1* | 4/2019 | Kennedy ................ H01H 89/00 |
| 2022/0190586 A1* | 6/2022 | Zimmermann ...... H02H 1/0007 |

* cited by examiner

CIRCUIT BREAKER FOR BREAKING AN ELECTRICAL CIRCUIT

TECHNICAL FIELD

The invention relates to a circuit breaker for breaking an electrical circuit. Especially, the invention relates to a circuit breaker for handling inrush current as well as overload and short circuit. The invention also relates to a circuit comprising such a circuit breaker and a corresponding method.

BACKGROUND

A fuse is a device used to protect an electrical circuit from overcurrent, such as inrush current, overload and short circuit. This simple electrical device has a metal wire or metal strip that melts when too much current flows through them. Hence, the fuse only operates once and thereafter has to be replaced.

A circuit breaker on the other hand is an automatically operated electrical switch designed to protect electrical circuits from damage caused by overcurrent. The circuit breaker can be reset and therefore reused. The general idea of circuit breakers is to interrupt the current flow, i.e. to break the circuit by means of the switches, when a fault such as overcurrent is detected. The circuit breaker can be designed to protect low current circuits, and household appliances up to high voltage circuits. For example, miniature circuit breaker can be designed for rated current up to 100 A whilst molded case circuit breakers can be designed for rated current up to 2 500 A.

SUMMARY

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect of the invention, the above mentioned and other objectives are achieved with a circuit breaker for breaking a circuit, the circuit breaker being arranged between a power supply and a load, wherein the circuit breaker comprises control means configured to switch switching means of the circuit breaker between an ON-mode in which a current i is fed to the load, and an OFF-mode in which no current is fed to the load; wherein the control means is configured to
  a) obtain a value of the current i fed to the load when the switching means is in the ON-mode;
  b) keep the switching means in the ON-mode if the value of the current i is smaller than a switching current $i_S$ of the circuit breaker;
  c) switch the switching means into the OFF-mode if the value of the current i is larger than a switching current $i_S$ of the circuit breaker and switch the switching means from the OFF-mode back into the ON-mode after a first time interval $T_1$.

The circuit breaker can be a digital circuit breaker. The switching means of the circuit breaker can be electronic switching means, e.g. a transistor, such as a field effect transistor (FET), which means that the switching time is much faster than the switching time of conventional circuit breakers.

The control means can be any of a software solution, a hardware solution or a combination of software and hardware. For example, as a software solution the control means can be implemented in a microcontroller whilst in a hardware solution the control means can be implemented in physical logical circuits.

The switching current $i_S$ of the circuit breaker is a current at which the switching means is switched from the ON-mode to the OFF-mode. The switching current can be a threshold current value. In an implementation form, the switching current can be dynamically changed to different values depending on application. The dynamically change of the switching current can be controlled by a software solution a hardware solution or a combination of software and hardware.

A switching time of the circuit breaker can be considered as a time from when a switching current of the transistor has been detected until the transistor is set in OFF-mode (not conductive anymore). The switching time can be the sum of time for detection of overcurrent (hardware limit reached) plus the switching time of the transistor into the OFF-mode. For example, the switching time of the circuit breaker can be 250 ns or less. The switching time of conventional circuit breakers can be larger than 1 ms. Hence, the switching time of the circuit breaker is always shorter than the switching time of the conventional circuit breakers which also means that the circuit breaker is faster than the conventional circuit breaker.

An advantage of the circuit breaker according to the first aspect is that due to the fact the switching means switch back from the OFF-mode into the ON-mode after a first time interval $T_1$ and if the overcurrent situation is of short duration, e.g. inrush current, the circuit will automatically operate at normal mode meaning that the load will work properly after the first time interval $T_1$. The circuit breaker can hence protect the load and components in the circuit from overcurrent of short duration with minimal impact on the current to the load.

In an implementation form of a circuit breaker according to the first aspect, the control means is further configured to
  repeat steps a) to c) N number of times, where N is an integer.

An advantage of this implementation form is that the circuit breaker can check at predetermined intervals, i.e. after each first time interval $T_1$, whether the overcurrent situation remains or not. The circuit breaker can thereby quickly restore normal operation for overcurrent situations which lasts longer than the first time interval $T_1$ but which are still of short duration. Thereby, a consecutive number of inrush current instances can be handled in the alternating current (AC) case. In the direct current (DC) case capacitive load can be handled.

In an implementation form of a circuit breaker according to the first aspect, the control means is further configured to
  hold the switching means in the OFF-mode during a second time interval $T_2$ if steps a) to c) have been repeated the N number of times.

In an implementation form of a circuit breaker according to the first aspect, the N number of times is equal to or less than 10.

In an implementation form of a circuit breaker according to the first aspect, the second time interval $T_2$ is larger than the first time interval $T_1$.

In an implementation form of a circuit breaker according to the first aspect, the second time interval $T_2$ is shorter than or equal to 5 s.

In an implementation form of a circuit breaker according to the first aspect, the first time interval $T_1$ is shorter than or equal to 10 ms.

In an implementation form of a circuit breaker according to the first aspect, the switching current $i_S$ of the circuit breaker is between 2 to 20 times a nominal current of the circuit breaker. The nominal current of the circuit breaker may correspond to the current for which the circuit breaker is dimensioned.

In an implementation form of a circuit breaker according to the first aspect, a switching time of the circuit breaker is equal to or less than 250 ns.

In an implementation form of a circuit breaker according to the first aspect, the current i is alternating current and wherein the control means is further configured to
switch the switching means from the OFF-mode to the ON-mode during a zero-crossing of the AC.

Thereby, the current fed to the load will have ideal properties at restart, i.e. when the switching means is switched back to ON-mode from OFF-mode.

In an implementation form of a circuit breaker according to the first aspect, the first time interval $T_1$ is dependent on the zero-crossing of the alternating current.

In an implementation form of a circuit breaker according to the first aspect, the first time interval $T_1$ is a time interval between two consecutive zero-crossings of the alternating current.

In an implementation form of a circuit breaker according to the first aspect, the circuit breaker further comprises current monitoring means configured to
monitor a current i fed from the power supply to the load; and
provide a value of the monitored current i to the control means.

In an implementation form of a circuit breaker according to the first aspect, the current i is a direct current, and wherein the first time interval $T_1$ is dependent on an energy storing property of the current monitoring means.

In an implementation form of a circuit breaker according to the first aspect, the first time interval $T_1$ is longer than a threshold time interval defining when the current monitoring means has lost substantially all of its stored energy.

In an implementation form of a circuit breaker according to the first aspect, the current monitoring means is an inductor having an inherent resistance used to provide the value of the monitored current i fed from the power supply to the load.

In an implementation form of a circuit breaker according to the first aspect, the control means is configured to
set the value of the switching current $i_S$ of the circuit breaker.

An advantage of this implementation form is that the switching current $i_S$ of the circuit breaker can be changed, e.g. adapted to different scenarios.

In an implementation form of a circuit breaker according to the first aspect, the control means is further configured to b) switch the switching means into the OFF-mode if the value of the current i is larger than a switching current $i_S$ of the circuit breaker and in dependence on at least one of a duration of the switching current $i_S$ and a duration until the switching current $i_S$ is reached.

The duration of the switching current $i_S$ may be a third time interval $T_3$ corresponding to a time interval during which the value of the current i is larger than the switching current $i_S$. The duration until the switching current $i_S$ is reached may be a fourth time interval $T_4$ corresponding to a time interval from when the switching mean is switched into the ON-mode until the value of the current i is larger than the switching current $i_S$ of the circuit breaker.

An advantage of this implementation form is that a more flexible switching can be provided, allowing the switching to be further adapted to characteristics of the detected overcurrent.

According to a second aspect of the invention, the above mentioned and other objectives are achieved with an electrical circuit comprising a power supply arranged to feed a current to a load and a circuit breaker according to the first aspect, wherein the circuit breaker is coupled between the power supply and the load.

According to a third aspect of the invention, the above mentioned and other objectives are achieved with a method for a circuit breaker being arranged between a power supply and a load, the method comprising
obtaining a value of the current i fed to the load;
switching the switching means into an OFF-mode, in which no current is fed to the load, if the value of the current i is larger than a switching current $i_S$ of the circuit breaker; and
switching the switching means from the OFF-mode back into an ON-mode, in which a current i is fed to the load, after a first time interval $T_1$.

The method according to the third aspect can be extended into implementation forms corresponding to the implementation forms of the circuit breaker according to the first aspect.

Hence, an implementation form of the method comprises the feature(s) of the corresponding implementation form of the circuit breaker.

The advantages of the methods according to the third aspect are the same as those for the corresponding implementation forms of the circuit breaker according to the first aspect.

Further applications and advantages of the embodiments of the invention will be apparent from the following detailed description.

BRIEF DESCRIPTION OF THE DRAWINGS

The appended drawings are intended to clarify and explain different embodiments of the invention, in which.

DETAILED DESCRIPTION

Figure 1:
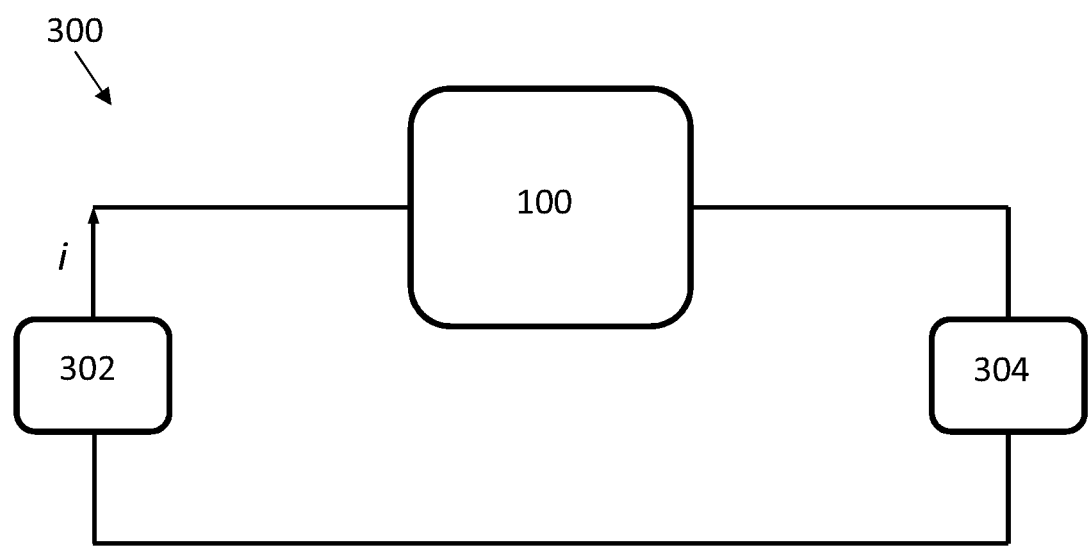
FIG. 1 shows a circuit breaker according to an embodiment of the invention.

FIG. 1 shows a circuit breaker 100 according to an embodiment of the invention. The circuit breaker 100 is arranged for breaking an electrical circuit 300 such that no current can reach at least one electrical load 304. Therefore, the electrical circuit 300 comprises at last one power supply 302 arranged to supply a current i (or a corresponding voltage) to at least one load 304 which means that the power supply 302 is electrically coupled to the load 304. Examples of loads 304 are household appliances but are not limited thereto. Hence, a load in this context relate to an electrical device arranged to consume electrical power for its functioning. The power supply 302 is arranged to supply an alternating current (AC) current or a direct current (DC)

depending on application. The supplied current can e.g. be mains current with nominal voltage of 110V or 220V and with a frequency of 50 Hz. However, the invention is not limited thereto and hence embodiments of the invention can be applied from all types of voltage systems, from low voltage systems to high voltage systems.

A circuit breaker 100 according to embodiments of the invention is coupled between the power supply 302 and the load 304 as shown in FIG. 1. When the circuit breaker 100 breaks the circuit 300 no current i can reach the load 304. In this respect the circuit breaker 100 comprises switching means 106 arranged to be controlled by control means 104. The switching means 106 is arranged to switch between an ON-mode, in which a current i from the power supply 302 is fed to the load 304, and an OFF-mode, in which no current is fed to the load 304. The switching means 106 hence act as switches closing or opening the circuit. The control means 104 can e.g. be a digital microcontroller but is not limited thereto.

The switching means 106 may be an electronic switching means, e.g. a transistor such as a field effect transistor (FET). The fast switching time of a transistor allows the switching time of the circuit breaker 100 to be shorter than the switching time of conventional circuit breakers. Thus, the circuit breaker 100 is faster than conventional circuit breakers and can provide an improved protection against overcurrent and/or short circuits. In embodiments, the switching time of the circuit breaker 100 can be 250 ns or less.

The control means 104 is configured to obtain a value of the current which is supplied by the power supply and fed to the load 304 and based on the obtained value of the current the control means 104 controls the switching means 106 accordingly. More specifically, the control means 104 herein is configured to: a) obtain a value of the current i fed to the load 304 when the switching means 106 is in the ON-mode; b) keep the switching means 106 in the ON-mode if the value of the current i is smaller than a switching current $i_S$ of the circuit breaker 100; and c) switch the switching means 106 into the OFF-mode if the value of the current i is larger than the switching current $i_S$ of the circuit breaker 100 and switch the switching means 106 from the OFF-mode back into the ON-mode after a first time interval $T_1$. The switching means 106 is hence kept in the ON-mode as long as the value of the current i is smaller than the switching current $i_S$ and switched into the OFF-mode for the duration of the first time interval $T_1$ when the value of the current i is larger than the switching current $i_S$.

Both the first time interval $T_1$ and the switching current $i_S$ of the circuit breaker 100 may vary depending on e.g. the environment in which the circuit breaker 100 is used. The first time interval $T_1$ may in embodiments be shorter than or equal to 10 ms but is not limited thereto. In embodiments, the switching current $i_S$ of the circuit breaker 100 may be between 2 and 20 times a nominal current of the circuit breaker 100. The nominal current of the circuit breaker 100 may correspond to the current for which the circuit breaker 100 is dimensioned and may e.g. be 6 A, 10 A, 16 A, or 25 A but may also be smaller or larger than these values. In non-limiting examples, the switching current $i_S$ of the circuit breaker 100 may be 3, 5, or 10 times the nominal current of the circuit breaker 100. Thus, the switching current $i_S$ of the circuit breaker 100 may e.g. be 30 A, 50 A, or 100 A when the nominal current of the circuit breaker 100 is 10 A. However, other values of the switching current $i_S$ is also possible without deviating from the scope of the invention.

According to embodiments of the invention the control means 104 may further be configured to set the value of the switching current $i_S$ of the circuit breaker 100. Hence, the switching current $i_S$ of the circuit breaker 100 may in embodiments be configurable and may be changed by the control means 104. The control means 104 may e.g. set the value of the switching current $i_S$ of the circuit breaker 100 based on input and/or measurements collected in the circuit breaker 100 or received from an external device. The control means 104 may further set the value of the switching current $i_S$ of the circuit breaker 100 based on a control signal received internally or from an external device.

The control means 104 may further consider a duration of the switching current $i_S$ when determining whether to switch the switching means 106 in step c). The control means 104 may hence be configured to switch the switching means 106 into the OFF-mode if the value of the current i is larger than the switching current $i_S$ of the circuit breaker 100 and in dependence on the duration of the switching current $i_S$. The duration of the switching current $i_S$ may correspond to a third time interval $T_3$ during which the value of the current i is larger than the switching current $i_S$. The duration of the switching current $i_S$ may be determined/measured by the circuit breaker 100 and the control means 104 may e.g. switch the switching means 106 into the OFF-mode if the duration of the switching current $i_S$ is longer than a threshold value. Thus, the control means 104 may in embodiments not switch of the switching means 106 into the OFF-mode directly when the value of the current i has reached the switching current $i_S$, the control means 104 may instead switch the switching means 106 into the OFF-mode after a delay.

The control means 104 may further consider a duration until the switching current $i_S$ is reached when determining whether to switch the switching means 106 in step c). The control means 104 may hence be configured to switch the switching means 106 into the OFF-mode if the value of the current i is larger than the switching current $i_S$ of the circuit breaker 100 and in dependence on the duration until the switching current $i_S$ is reached. The duration until the switching current $i_S$ is reached may be a fourth time interval $T_4$ corresponding to a time interval from when the switching means 106 is switched into the ON-mode until the value of the current i is larger than the switching current $i_S$ of the circuit breaker 100. The duration until the switching current $i_S$ is reached may be determined/measured by the circuit breaker 100 and the control means 104 may e.g. switch the switching means 106 into the OFF-mode if the duration until the switching current $i_S$ is reached is longer or shorter than a threshold value.

In embodiments of the invention, the control means 104 is further configured to repeat steps a) to c) N number of times, where N is a positive integer. Hence, the circuit breaker 100 can according to this embodiment repeat the steps a) to c) a predetermined number of times. If the current i fed to the load 304 is less than the switching current $i_S$ of the circuit breaker 100 during one of the repetitions the switching means 106 can be kept in the ON-mode. After being switched off due to a detected high current, the circuit breaker 100 can hence at predetermined intervals, i.e. after each first time interval $T_1$, switch on to check whether the fault situation remains or not. In this way, the circuit breaker 100 can quickly restore normal operation, i.e. the switching means 106 being in the ON-mode, if the fault is of short duration.

On the other hand, if steps a) to c) have been repeated the N number of times and the current i fed to the load 304 is still larger than the switching current $i_S$ of the circuit breaker 100, the switching means 106 is held in the OFF-mode during a second time interval $T_2$. The second time interval $T_2$ may be larger than the first time interval $T_1$. A longer period of high current indicates a fault and hence that the switching means 106 should be held in the OFF-mode for a longer period of time.

Furthermore, by comparing the duration until the switching current $i_S$ is reached, i.e. the duration from the switching means 106 is switched into the ON-mode until the current i is larger than the switching current $i_S$, for each repetition, the control means 106 may determine the cause of the overcurrent. In case of a short circuit, the duration until the switching current $i_S$ is reached is typically the same for each repetition. On the other hand, if a higher than allowed capacitance is connected to the circuit 300, the duration until the switching current $i_S$ is reached is typically larger in a second repetition than after the first switch off. This information may then be used to change the behaviour of the circuit breaker 100, e.g. change the values of the N number of times, the first time interval $T_1$ and/or the second time interval $T_2$. For example, if a short circuit is detected based on the duration until the switching current $i_S$ is reached, the N number of times may be decreased and the second time interval $T_2$ increased such that no more attempts to switch on the circuit breaker 100 is performed and the switching means 106 is held in the OFF-mode.

Figure 2:
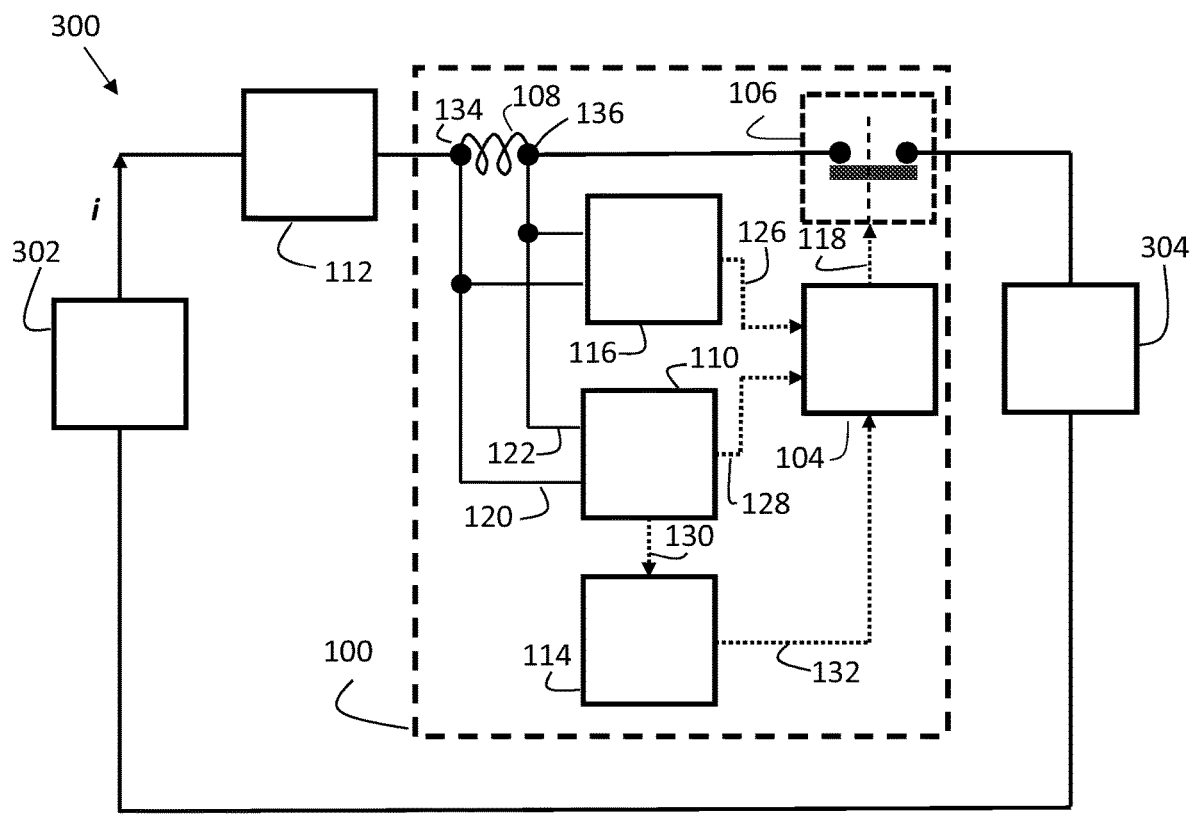
FIG. 2 shows a circuit breaker according to an embodiment of the invention.

FIG. 2 shows a circuit breaker 100 according to a further embodiment of the invention. The circuit breaker 100 in FIG. 2 is shown in more detail compared to the one in FIG. 1. The circuit breaker 100 in FIG. 2 comprises current monitoring means 108 configured to continuously monitor the current i fed from the power supply 302 to the load 304, and to provide the value of the monitored current i to the control means 104 through signal coupling 120 and 122 via a threshold detector 110. The monitoring can be performed by the current monitoring means 108 configured to continuously measuring the current i fed by the power supply and provide the measured values of the current i to the threshold detector 110.

In the threshold detector 110 both switching current $i_S$ and breaking current $i_{Br1}$ is checked. If the measured valued is larger than a threshold value for the switching current $i_S$ the threshold detector 110 triggers the control means 104 through signal coupling 128 which results in that the control means 104 switches the switching means 106 from ON-mode into OFF-mode through control interface 118. The threshold detector 110 is hence configured to trigger the control means 104 when the measured value of the current i is larger than the switching current $i_S$ of the circuit breaker 100. Based on the trigger from the threshold detector 110, the control means 104 switches the switching means 106 into the OFF-mode and further switches the switching means 106 from the OFF-mode back into the ON-mode after the first time interval $T_1$. In this way, the current i is again fed to the load 304 and measured by the current monitoring means 108 after the first time interval $T_1$. If the measured value of the current i is smaller than the switching current $i_S$ of the circuit breaker 100, the switching means 106 is kept in the ON-mode. On the other hand, if the measured value of the current i is still larger than the switching current $i_S$ of the circuit breaker 100, the control means 104 again switches the switching means 106 into the OFF-mode and then back into the ON-mode after the first time interval $T_1$. Thus, when the current i fed to the load 304 is larger than the switching current $i_S$ of the circuit breaker 100 for a duration which shorter than the first time interval $T_1$, normal operation of the circuit breaker 100 can quickly be restored. At the same time, the circuit breaker 100 can also handle overcurrent with longer durations as the switching means 106 can be repeatedly switched off and on.

If however, the measured value of the current i is larger than the breaking current $i_{Br1}$ of the circuit breaker 100 the control means 104 will immediately switch the switching means 106 into the OFF-mode so that components in the circuit breaker 100 is not harmed. In this scenario, the control means 104 does not switch the switching means 106 back into the ON-mode after the first time interval $T_1$ instead the switching means 106 is kept in the OFF-mode. The switching means 106 may e.g. be kept in the OFF-mode until a manual reset of the circuit breaker 100 is performed.

In embodiments of the invention, the current monitoring means 108 is an inductor such as a coil as illustrated in FIG. 2. The function of the coil is to delay overcurrent so that the switching means can be set to OFF-mode before electrical components are damaged. The coil has two measurement nodes 134 and 136 which are arranged on different sides of the inductive section of the coil. Hence, both a zero-crossing detector 116 and a threshold detector 110 are in this embodiment arranged to measure the current at the measurement nodes 134 and 136 of the coil. In other words, the current monitoring means 108, or in this case the coil, is connected to zero-crossing detector 116 via coupling 120 to measurement node 134 and coupling 122 to measurement node 136. The zero-crossing detector 116 is herein configured to detect zero-crossings if the current fed from the power supply 302 is AC. Therefore, the zero-crossing detector 116 indicates zero-crossings to the control means 104 through signal means 126 so that the control means 104 can switch back the switching means to ON-mode at a zero-crossing. This means that the zero-crossing detector 116 is only relevant for the AC case.

FIG. 2 also shows delay block 114 which is arranged to provide correct time delays to the control means 104 through signal means 132. For example, in the DC case the first time interval $T_1$ in embodiments is longer than a threshold time interval defining when the current monitoring means 108 has lost substantially all of its stored energy. Hence, in this case the first time interval $T_1$ can be provided to the control means as a delay by the delay block 114. Therefore, the threshold detector 110 can trigger/notify the delay block 114 through signal means 130.

As also shown in FIG. 2 in embodiments of the invention, the circuit breaker 100 is coupled in series with another second circuit breaker 112, and where the circuit breaker 100 and the second circuit breaker 112 together are coupled between the power supply 302 and the load 304. In embodiments the second circuit breaker 112 is a so called standardized circuit breaker, such as a fuse, a two or four pole miniature circuit breaker or any other suitable standardized circuit breaker. An example of a standard for circuit breakers is IEC 60898-1. With a standardised second circuit breaker the circuit breaker 100 according to the first aspect will fulfil safety requirements set by national, regional and international governmental bodies and organisations in electrical safety. According to these embodiments, the switching time of the circuit breaker 100 is less than a switching time of the second circuit breaker 112.

In further embodiments of the invention, a breaking current $i_{Br1}$ of the circuit breaker 100 is larger than the breaking current of the second circuit breaker 112. The breaking current $i_{Br1}$ of the circuit breaker 100 is in embodiments at least three times higher than the breaking current $i_{Br2}$ of the second circuit breaker 112. For digital circuit breakers the capability of the transistor (switch of the circuit breaker, i.e. in this case the switching means) to handle peak currents sets the hardware limit for the breaking current. The breaking current $i_{Br1}$ of the circuit breaker 100 can be considered as the hardware limit set to protect the switching means, such as a transistor acting as switches, from overcurrent. The breaking current $i_{Br2}$ of the second circuit breaker 112 can be the rated current for the second circuit breaker 112.

Furthermore, in yet further embodiments of the invention, the second circuit breaker 112 is integrated with the circuit breaker 100, e.g. arranged inside the same housing or on a common PCB. In one case a metal strip corresponding to a fuse is arranged in the common PCB and acts as a second circuit breaker 112. The metal strip would correspond to the thermal trigger of a MCB, as shown in FIG. 3.

Figure 3:
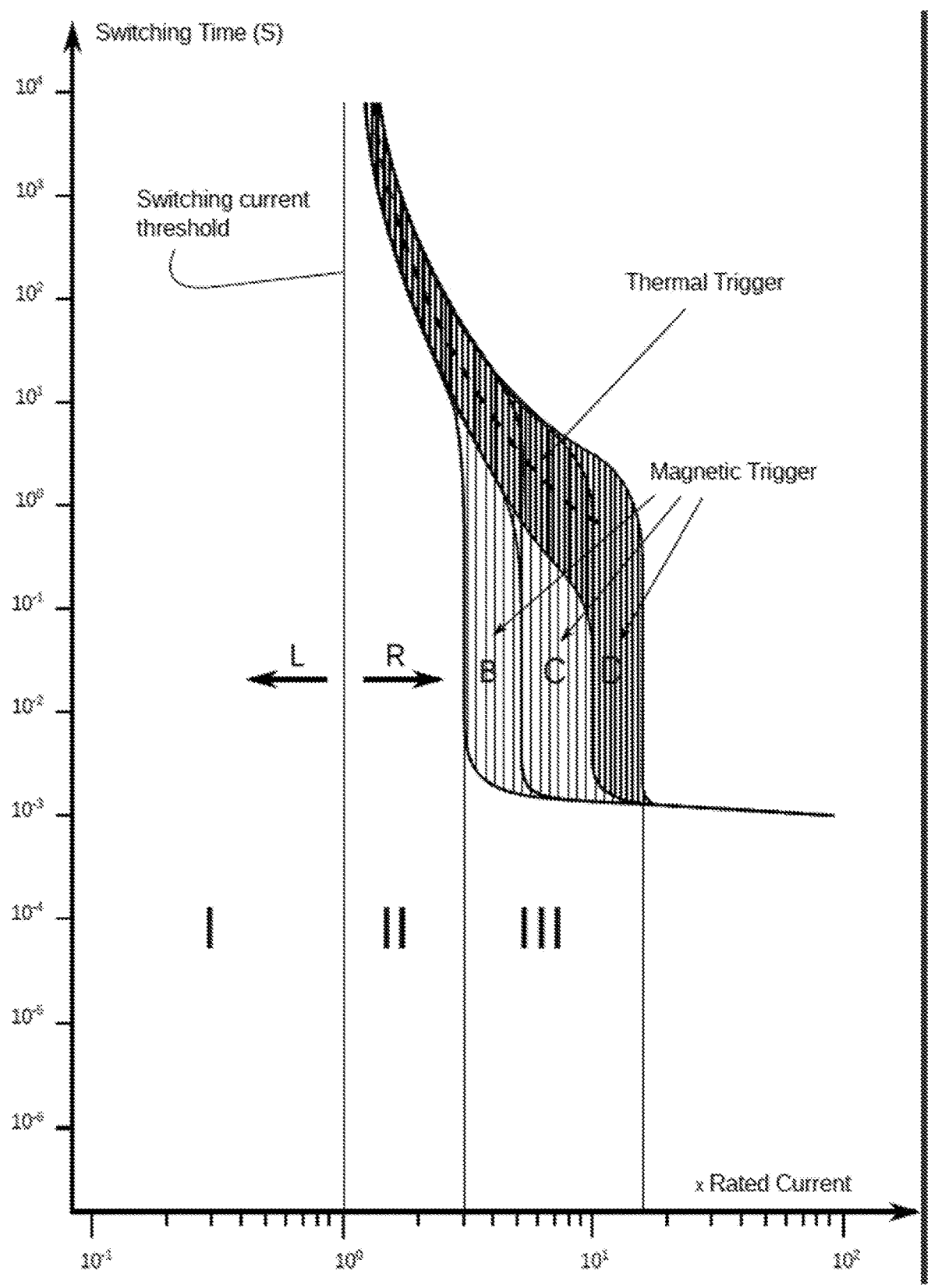
FIG. 3 shows the relation between switching time and rated current in a diagram.

FIG. 3 shows the relation between switching time and rated current in a diagram. The x-axis shows the rated current (times "x" the nominal value given) and the y-axis shows the switching time in seconds. The magnetic trigger zones marked B, C and D in FIG. 3 relate to different standardised rated overcurrent for miniature circuit breakers (MCBs). The thermal trigger zone on the other hand relates to heat generated by the energy (i.e. current*time) generated in the MCB.

The vertical line denoted "switching current threshold" demarks zone I and II in FIG. 3. Zone I relates to a software defined current limit in relation to the switching current threshold (SCT), and Zone II relates to software defined overcurrent limit in relation to the switching current threshold. In embodiments of the invention, the SCT can be changed or set and controlled by software. This is illustrated with the right R arrow and left L arrow in FIG. 3. This means that when a measured current is over a current SCT the software e.g. in a microcontroller can decide to raise the SCT so that no switching is performed if it is decided that the measured current is not harmful to the circuit breaker itself or to the load. Hence, this situation arises when the measured current is above the current SCT but below the breaking current of the circuit breaker 100. The reverse case can also happen, i.e. that the SCT is lowered. For example, to save cost (lower tariff) the maximum rated current can be lowered by lowering the SCT. Zone III in FIG. 3 on the other hand relates to hardware defined overcurrent limit which is the same as the breaking current.

As previously stated, embodiments of the invention may relate to a circuit comprising an AC power supply, a DC power supply, or both an AC power supply and a DC power supply. In the following disclosure the different cases of AC and DC will be described more in detail.

Figure 4:
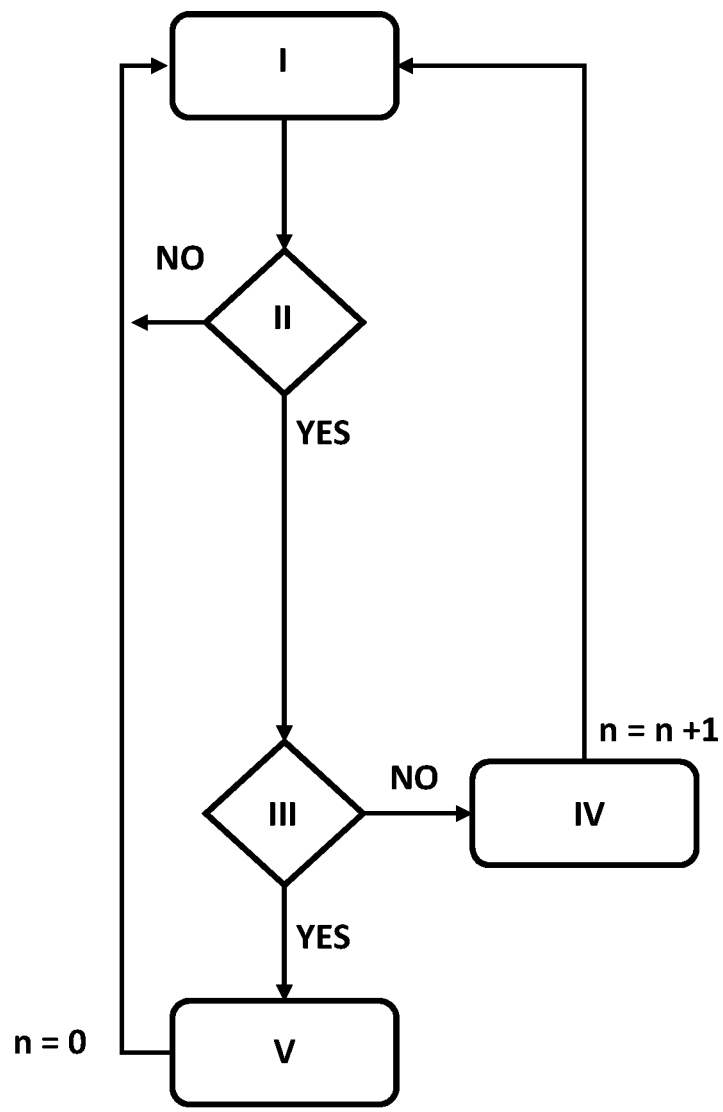
FIG. 4 shows a flow chart of a method according to an embodiment of the invention.

FIG. 4 shows a flow chart of a method according to the invention which also discloses further embodiments of the invention. Further, the AC and DC cases are also described with reference to FIG. 4. It is to be noted the different embodiments described in FIG. 4 also are applicable to corresponding embodiments of the circuit breaker, i.e. to corresponding embodiments of the circuit breaker device and are not limited to the method.

In step I in FIG. 4, the current fed by the power supply to the load is continuously measured or monitored. In embodiments of the invention, the current is monitored with the use of current monitoring means 108 as previously described.

In step II in FIG. 4, it is checked if the measured current is higher than a threshold current of the circuit breaker 100, i.e. a switching current. If NO in step II, i.e. the measured current is below the threshold current, the method returns back to step I and continues to measure the current fed by the power supply 302. If however YES in step II, i.e. the measured current is higher than the threshold current, the method continues to step III.

In step III in FIG. 4, it is checked if a maximum number of consecutive overcurrent detections (e.g. inrush current) n has been reached, where n is a counter value indicating the number of consecutive overcurrent detected. If YES in step III this is the same as if the measured current has been higher than the threshold current N number of times. If NO in step III the method continues to step IV else if YES in step III the method continues to step V. In embodiments of the invention, N is equal to or less than 10.

In step IV in FIG. 4, i.e. determined NO in step III, the circuit breaker 100 breaks the circuit by switching the switching means into OFF-mode during a first time interval $T_1$ and thereafter switched back to ON-mode. The counter n is incremented with value 1, i.e. n=n+1 and the method returns back to step I.

In the AC case when the power supply feds AC to the load, $T_1$ is so designed that the switching means is switched back to ON-mode at a zero-crossing according to embodiments of the invention. Hence, the first time interval $T_1$ is dependent on the zero-crossing of the AC current. The first time interval $T_1$ is e.g. a time interval between two consecutive zero-crossings of the AC current and therefore the next zero-crossing after overcurrent detected. It is noted that the first time interval $T_1$ can vary between consecutive detected overcurrent. Hence, the first time interval $T_1$ can be designed for optimal performance.

In the DC case when the power supply feds DC to the load 304 the first time interval $T_1$ is dependent on an energy storing property of the current monitoring means 108 according to embodiments of the invention. As previously mentioned, said current monitoring means 108 may be an inductor, such as a coil, having an inherent resistance configured to provide the value of the monitored current i fed from the power supply 302 to the load 304. Hence, in embodiments the first time interval $T_1$ is longer than a threshold time interval defining when the current monitoring means 108 has lost substantially all of its stored energy in the DC case.

In step V in FIG. 4, i.e. YES in step III, circuit breaker 100 breaks the circuit by switching the switching means into OFF-mode during a second time interval $T_2$, where $T_2$ is larger than $T_1$. i.e. $T_2 > T_1$. The counter n is also reset to zero, i.e. n=0 and the method returns back to step I.

In the AC case $T_2$ is so designed that the switching means is switched back to ON-mode at a zero-crossing after a consecutive number of zero-crossings according to embodiments of the invention.

In embodiments of the invention, $T_2$ is designed to be shorter than or equal to 5 s both in the AC and the DC case due to the human perception of electrical fail situations. It is however noted that the parameter $T_2$ can be designed to other values. Hence, the parameter $T_2$ can in embodiments be dynamically adapted to different applications.

Finally, it should be understood that the invention is not limited to the embodiments described above, but also relates to and incorporates all embodiments within the scope of the appended independent claims.

The invention claimed is:

1. A circuit breaker for breaking a circuit, the circuit breaker being arranged between a power supply and a load, wherein the circuit breaker comprises control means configured to switch switching means of the circuit breaker between an ON-mode in which a current i is fed to the load, and an OFF-mode in which no current is fed to the load; wherein the control means is configured to:
  a) obtain a value of the current i fed to the load when the switching means is in the ON-mode;
  b) keep the switching means in the ON-mode if the value of the current i is smaller than a switching current is of the circuit breaker; and
  c) switch the switching means into the OFF-mode if the value of the current i is larger than the switching current is of the circuit breaker and switch the switching means from the OFF-mode back into the ON-mode after a first time interval $T_1$;
  wherein the control means is further configured to: (i) repeat steps a) to c) N number of times, where N is an integer, and (ii) hold the switching means in the OFF-mode during a second time interval $T_2$ if steps a) to c) have been repeated the N number of times.

2. The circuit breaker according to claim 1, wherein the N number of times is equal to or less than 10.

3. The circuit breaker according to claim 1, wherein the second time interval $T_2$ is larger than the first time interval $T_1$.

4. The circuit breaker according to claim 3, wherein the second time interval $T_2$ is shorter than or equal to 5 s.

5. The circuit breaker according to claim 1, wherein the switching current is of the circuit breaker is between 2 to 20 times a nominal current of the circuit breaker.

6. The circuit breaker according to claim 1, wherein the current monitoring means is an inductor having an inherent resistance configured to provide the value of the monitored current i fed from the power supply to the load.

7. The circuit breaker according to claim 1, wherein the control means further is configured to set the value of the switching current $i_S$ of the circuit breaker.

8. The circuit breaker according to claim 1, wherein the control means further is configured to:
  b) switch the switching means into the OFF-mode if the value of the current i is larger than a switching current $i_S$ of the circuit breaker and in dependence on at least one of a duration of the switching current $i_S$ and a duration until the switching current $i_S$ is reached.

9. An electrical circuit comprising a power supply arranged to feed a current to a load and a circuit breaker according to claim 1, wherein the circuit breaker is coupled between the power supply and the load.

10. A circuit breaker for breaking a circuit, the circuit breaker being arranged between a power supply and a load, wherein the circuit breaker comprises control means configured to switch switching means of the circuit breaker between an ON-mode in which a current i is fed to the load, and an OFF-mode in which no current is fed to the load; wherein the control means is configured to:
  a) obtain a value of the current i fed to the load when the switching means is in the ON-mode;
  b) keep the switching means in the ON-mode if the value of the current i is smaller than a switching current is of the circuit breaker; and
  c) switch the switching means into the OFF-mode if the value of the current i is larger than the switching current is of the circuit breaker and switch the switching means from the OFF-mode back into the ON-mode after a first time interval $T_1$;
  wherein the current i is alternating current and wherein the control means is further configured to switch the switching means from the OFF-mode to the ON-mode during a zero crossing of the alternating current.

11. The circuit breaker according to claim 10, wherein the control means is further configured to repeat steps a) to c) N number of times, where N is an integer.

12. The circuit breaker according to claim 11, wherein the control means is further configured to hold the switching means in the OFF-mode during a second time interval $T_2$ if steps a) to c) have been repeated the N number of times.

13. The circuit breaker according to claim 10, wherein the first time interval Tis dependent on the zero-crossing of the alternating current.

14. The circuit breaker according to claim 13, wherein the first time interval Tis a time interval between two consecutive zero-crossings of the alternating current.

15. A circuit breaker for breaking a circuit, the circuit breaker being arranged between a power supply and a load, wherein the circuit breaker comprises control means configured to switch switching means of the circuit breaker between an ON-mode in which a current i is fed to the load, and an OFF-mode in which no current is fed to the load; wherein the control means is configured to:
  a) obtain a value of the current i fed to the load when the switching means is in the ON-mode;
  b) keep the switching means in the ON-mode if the value of the current i is smaller than a switching current is of the circuit breaker; and
  c) switch the switching means into the OFF-mode if the value of the current i is larger than the switching current is of the circuit breaker and switch the switching means from the OFF-mode back into the ON-mode after a first time interval $T_1$;
  wherein the circuit breaker further comprises current monitoring means configured to:
  monitor the current i fed from the power supply to the load, wherein the current i is a direct current; and
  provide a value of the monitored current i to the control means;
  wherein the first time interval $T_1$ is dependent on an energy storing property of the current monitoring means.

16. The circuit breaker according to claim 15, wherein the first time interval $T_1$ is longer than a threshold time interval defining when the current monitoring means has lost substantially all of its stored energy.

* * * * *